US012792462B2

(12) United States Patent
Kim et al.

(10) Patent No.: US 12,792,462 B2
(45) Date of Patent: Nov. 10, 2026

(54) MEMORY DEVICE, PROCESSOR, AND OPERATING METHOD OF THE MEMORY DEVICE TO RESTORE DATA DURING POWER CUT-OFF

(71) Applicant: SAMSUNG ELECTRONICS CO., LTD., Suwon-si (KR)

(72) Inventors: Dongju Kim, Suwon-si (KR); Youngbong Kim, Suwon-si (KR); Eunkyung Choi, Suwon-si (KR); Changho Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/937,494

(22) Filed: Nov. 5, 2024

(65) Prior Publication Data

US 2025/0147845 A1 May 8, 2025

(30) Foreign Application Priority Data

Nov. 7, 2023 (KR) ........................ 10-2023-0153098

(51) Int. Cl.
*G06F 11/10* (2006.01)
*G06F 1/30* (2006.01)

(52) U.S. Cl.
CPC ............ *G06F 11/1068* (2013.01); *G06F 1/30* (2013.01); *G06F 11/1048* (2013.01)

(58) Field of Classification Search
None
See application file for complete search history.

(56) References Cited

U.S. PATENT DOCUMENTS 5,499,337 A 3/1996 Gordon
6,816,981 B2 11/2004 Morita et al.
7,911,836 B2 * 3/2011 Zilberman ............ G11C 16/12 365/185.12

(Continued)

FOREIGN PATENT DOCUMENTS

CN 110275596 A 9/2019

OTHER PUBLICATIONS

Anonymous: "Samsung DC Toolkit 3.0", , Oct. 30, 2023 (Oct. 30, 2023), pp. 1-34, XP093254586, Retrieved from the Internet: URL:https://download.semiconductor.samsung.com/resources/user-manual/Samsung_DCToolkit_V3.0_User_Guide.pdf [retrieved on Feb. 27, 2025].

(Continued)

*Primary Examiner* — Guerrier Merant
(74) *Attorney, Agent, or Firm* — Sughrue Mion, PLLC

(57) ABSTRACT

A memory device configured to restore data based on power supply being blocked during programming of a storage device includes a first area including a first data column that is to be programmed, a second area configured to store restoration data of the first data column, and a processor configured to identify a program state of the first data column programmed in a first stripe of the storage device, and complete programming of the first data column based on the program state of the first data column. The processor is further configured to determine that the programming of the first data column has stopped, to generate a second data column by combining the restoration data with a stopped portion of the first data column, and to program the second data column in a second stripe.

20 Claims, 14 Drawing Sheets

(56) References Cited

U.S. PATENT DOCUMENTS

| | | | |
|---|---|---|---|
| 8,327,224 B2 | | 12/2012 | Larsen et al. |
| 8,402,217 B2 | | 3/2013 | Burd |
| 8,527,698 B2 | | 9/2013 | Bert |
| 8,615,681 B2 | | 12/2013 | Horn |
| 8,700,951 B1 | | 4/2014 | Call et al. |
| 9,026,729 B1 | | 5/2015 | Hallak et al. |
| 9,478,271 B2 | * | 10/2016 | Chen ..................... G06F 3/0647 |
| 9,990,023 B2 | | 6/2018 | Paley et al. |
| 11,474,899 B2 | | 10/2022 | Kim et al. |
| 2012/0324150 A1 | | 12/2012 | Moshayedi et al. |
| 2018/0157428 A1 | | 6/2018 | Li |
| 2022/0093184 A1 | | 3/2022 | Kim et al. |

OTHER PUBLICATIONS

Communication dated Mar. 14, 2025, issued by the European Patent Office in European Application No. 24208052.1.

* cited by examiner

MEMORY DEVICE, PROCESSOR, AND OPERATING METHOD OF THE MEMORY DEVICE TO RESTORE DATA DURING POWER CUT-OFF

CROSS-REFERENCE TO RELATED APPLICATIONS

This application claims benefit of priority under 35 U.S.C. § 119 to Korean Patent Application No. 10-2023-0153098, filed on Nov. 7, 2023, in the Korean Intellectual Property Office, the disclosure of which is incorporated by reference herein in its entirety.

BACKGROUND

1. Field

The present disclosure relates generally to memory devices, and more particularly, to a memory device for programming data by combining pre-stored restoration data with valid data during a power cut-off.

2. Description of Related Art

When data is damaged, related memory devices may restore data according to a predetermined reference by storing parity data in a portion of a storage area, and as such, may provide a stable management method for the data stored in the memory devices.

However, when power supply to the storage area of the memory device is blocked and/or power supply is not provided to the storage area of a memory device according to a predetermined manner, valid data for which parity data has not been generated may not be restored.

There exists a need for further improvements in memory devices, as the need for valid data may be constrained by power cut-offs. Improvements are presented herein. These improvements may also be applicable to other storage technologies.

SUMMARY

One or more example embodiments of the present disclosure provide a memory device for restoring valid data with respect to which parity data is not generated, when power supply to a storage area of the memory device is blocked or power supply to the storage area of the memory device is not performed according to a predetermined manner.

According to an aspect of the present disclosure, a memory device configured to restore data based on power supply being blocked during programming of a storage device includes a first area including a first data column that is to be programmed, a second area configured to store restoration data of the first data column, and a processor configured to identify a program state of the first data column programmed in a first stripe of the storage device, and to complete programming of the first data column based on the program state of the first data column. The processor is further configured to determine that the programming of the first data column has stopped, to generate a second data column by combining the restoration data with a stopped portion of the first data column, and to program the second data column in a second stripe.

According to an aspect of the present disclosure, an operating method of a memory device for restoring data based on power supply being blocked during programming of a storage device includes identifying a program state of a first data column programmed in a first stripe of the storage device, and completing programming of the first data column based on the program state of the first data column. The completing of the programming of the first data column includes determining that the programming of the first data column has stopped, generating a second data column by combining restoration data with a stopped portion of the first data column, and programming the second data column in a second stripe.

According to an aspect of the present disclosure, a memory device configured to restore data based on power supply being blocked during programming of a storage device includes a memory storing instructions, and at least one processor communicatively coupled to the memory. The at least one processor is configured to execute the instructions to identify a program state of a first data column programmed in a first stripe of the storage device, and complete programming of the first data column based on the program state of the first data column. The at least one processor is further configured to execute the instructions to, based on a determination that the programming of the first data column has stopped, generate a second data column by combining restoration data with a stopped portion of the first data column and to program the second data column in a second stripe.

Additional aspects may be set forth in part in the description which follows and, in part, may be apparent from the description, and/or may be learned by practice of the presented embodiments.

BRIEF DESCRIPTION OF DRAWINGS

The above and other aspects, features, and advantages of certain embodiments of the present disclosure may be more apparent from the following description taken in conjunction with the accompanying drawings, in which.

DETAILED DESCRIPTION

Figure 1:
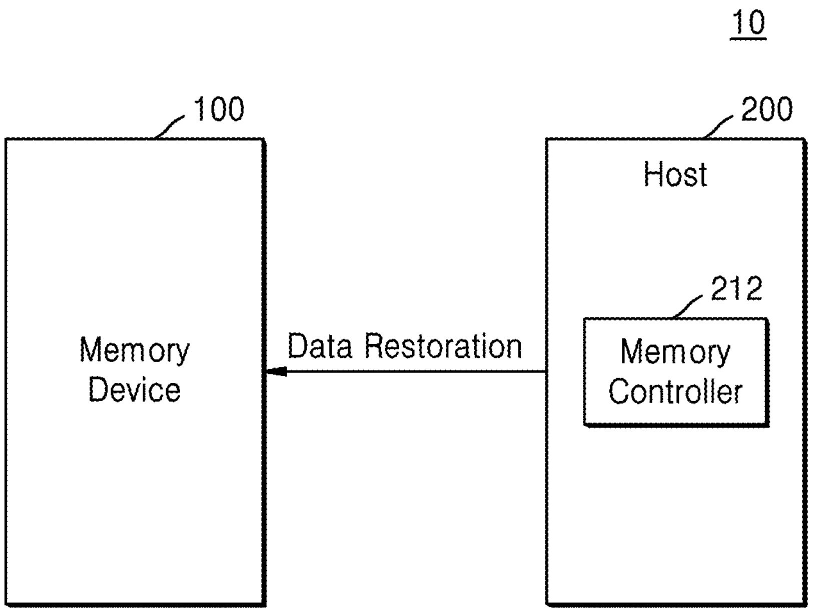
FIG. 1 is a block diagram of a memory system, according to an embodiment.

The following description with reference to the accompanying drawings is provided to assist in a comprehensive understanding of embodiments of the present disclosure defined by the claims and their equivalents. Various specific details are included to assist in understanding, but these details are considered to be exemplary only. Therefore, those of ordinary skill in the art may recognize that various changes and modifications of the embodiments described herein may be made without departing from the scope and spirit of the disclosure. In addition, descriptions of well-known functions and structures are omitted for clarity and conciseness.

With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

It is to be understood that when an element or layer is referred to as being "over," "above," "on," "below," "under," "beneath," "connected to" or "coupled to" another element or layer, it may be directly over, above, on, below, under, beneath, connected or coupled to the other element or layer or intervening elements or layers may be present. In contrast, when an element is referred to as being "directly over," "directly above," "directly on," "directly below," "directly under," "directly beneath," "directly connected to" or "directly coupled to" another element or layer, there are no intervening elements or layers present.

The terms "upper," "middle", "lower", and the like may be replaced with terms, such as "first," "second," third" to be used to describe relative positions of elements. The terms "first," "second," third" may be used to describe various elements but the elements are not limited by the terms and a "first element" may be referred to as a "second element". Alternatively or additionally, the terms "first", "second", "third", and the like may be used to distinguish components from each other and do not limit the present disclosure. For example, the terms "first", "second", "third", and the like may not necessarily involve an order or a numerical meaning of any form.

As used herein, when an element or layer is referred to as "covering" another element or layer, the element or layer may cover at least a portion of the other element or layer, where the portion may include a fraction of the other element or may include an entirety of the other element.

Reference throughout the present disclosure to "one embodiment," "an embodiment," "an example embodiment," or similar language may indicate that a particular feature, structure, or characteristic described in connection with the indicated embodiment is included in at least one embodiment of the present solution. Thus, the phrases "in one embodiment", "in an embodiment," "in an example embodiment," and similar language throughout this disclosure may, but do not necessarily, all refer to the same embodiment. The embodiments described herein are example embodiments, and thus, the disclosure is not limited thereto and may be realized in various other forms.

It is to be understood that the specific order or hierarchy of blocks in the processes/flowcharts disclosed are an illustration of exemplary approaches. Based upon design preferences, it is understood that the specific order or hierarchy of blocks in the processes/flowcharts may be rearranged. Further, some blocks may be combined or omitted. The accompanying claims present elements of the various blocks in a sample order, and are not meant to be limited to the specific order or hierarchy presented.

The embodiments herein may be described and illustrated in terms of blocks, as shown in the drawings, which carry out a described function or functions. These blocks, which may be referred to herein as units or modules or the like, or by names such as device, logic, circuit, controller, counter, comparator, generator, converter, or the like, may be physically implemented by analog and/or digital circuits including one or more of a logic gate, an integrated circuit, a microprocessor, a microcontroller, a memory circuit, a passive electronic component, an active electronic component, an optical component, and the like.

In the present disclosure, the articles "a" and "an" are intended to include one or more items, and may be used interchangeably with "one or more." Where only one item is intended, the term "one" or similar language is used. For example, the term "a processor" may refer to either a single processor or multiple processors. When a processor is described as carrying out an operation and the processor is referred to perform an additional operation, the multiple operations may be executed by either a single processor or any one or a combination of multiple processors.

As used herein, each of the terms "SiO", "SiN", and the like may refer to a material made of elements included in each of the terms and is not a chemical formula representing a stoichiometric relationship.

Hereinafter, various embodiments of the present disclosure are described with reference to the accompanying drawings.

FIG. 1 is a block diagram of a memory system 10, according to an embodiment.

Referring to FIG. 1, the memory system 10, according to an embodiment, may include a memory device 100 and a host 200. In the memory system 10, according to an embodiment, the host 200 may generate a data restoration command and transmit the generated data restoration command to the memory device 100. For example, a memory controller 212 included in the host 200 may generate a data restoration command and transmit the generated data restoration command to the memory device 100.

The memory device 100, according to an embodiment, may restore data when power is cut off during programming of a storage device. A program operation of the memory device 100, according to an embodiment, may be and/or may include a data write operation on the storage device. When a power supply is blocked while data is being written in the storage device, the memory device 100, according to an embodiment, may determine whether a data write operation has stopped and may combine pre-stored restoration data with a data column in which the data is written to perform a data restoration operation. For example, when power is shut off while a first data column is being programmed in a first area of the storage device of the memory device 100, the memory device 100 may combine the restoration data stored in a second area with the first data column to generate a second data column. The first data column, according to an embodiment, may be and/or may include a data column that the memory device 100 is to write, when there is no power cut-off. The second data column, according to an embodiment, may be and/or may include a data column in which the first data column is restored. For example, the second data column may be the same as the first data column which is completed when there is no power cut-off. Hereinafter, the first data column and the second data column may be interpreted as described above with reference to FIG. 1.

When power supply to the storage device is blocked, the memory device 100, according to an embodiment, may identify a program state with respect to the first data column and may complete a program operation with respect to the first data column based on the program state of the first data column. For example, when there is a power cut-off, the memory device 100 may determine whether the programming with respect to the first data column has stopped. When the memory device 100 determines that the programming with respect to the first data column has not been completely performed, the memory device 100, according to an embodiment, may generate the second data column by combining pre-stored restoration data with the first data column. The memory device 100, according to an embodiment, may store the second data column in an area different from an area in which the first data column is written. For example, the memory device 100 may write the second data column in a second stripe, when power supply is blocked while the first data column is being written in a first stripe. That is, the memory device 100 may write a data column in which the first data column is restored in the second stripe as the second data column. A stripe, according to an embodiment, may be and/or may include a programming unit with respect to a nonvolatile memory device. Alternatively or additionally, the first stripe may be and/or may include an area in which the first data column is written and the second stripe may be and/or may include an area in which the second data column is written. Hereinafter, the first stripe and the second stripe may be interpreted as described above with respect to FIG. 1. A data restoration operation of the memory device 100 is described with reference to FIGS. 2 and 3.

The host 200, according to an embodiment, may generate a data restoration command and transmit the generated data restoration command to the memory device 100. For example, the memory controller 212 included in the host 200 may generate a data restoration command and transmit the generated data restoration command to the memory device 100. The data restoration command, according to an embodiment, may be and/or may include a signal commanding the memory device 100 to perform a data restoration operation when power supply to the storage device is blocked.

Figure 2:
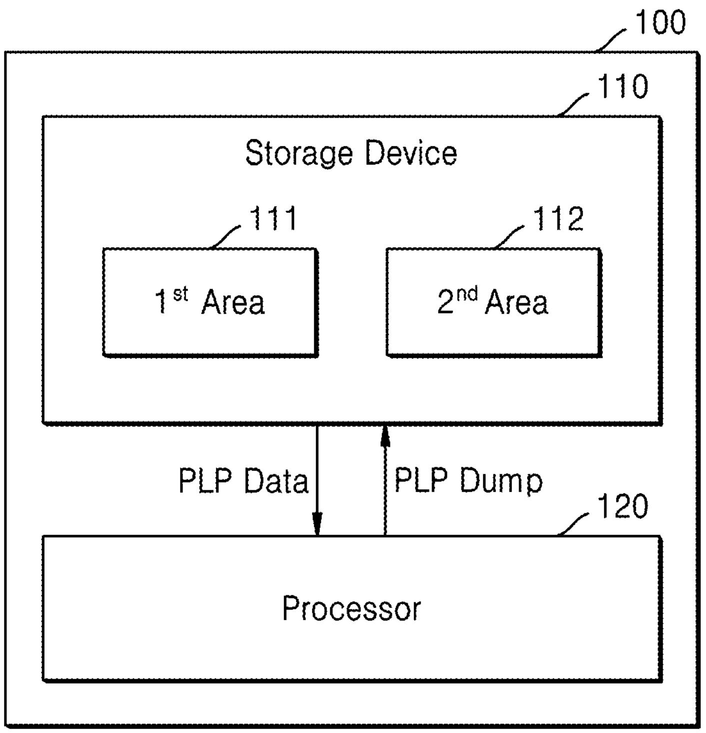
FIG. 2 is a block diagram of a memory device, according to an embodiment.

FIG. 2 is a block diagram of the memory device 100, according to an embodiment.

Referring to FIG. 2, the memory device 100, according to an embodiment, may include a storage device 110 and a processor 120. The storage device 110, according to an embodiment, may receive, from the processor 120, a request signal for restoration data PLP data and may provide the restoration data PLP data to the processor 120. The restoration data PLP data, according to an embodiment, may be and/or may include pieces (e.g., at least one portion) of data for restoring a first data column.

The storage device 110, according to an embodiment, may include a first area 111 and a second area 112. For example, the storage device 110 may be and/or may include a memory block included in the memory device 100 or a portion of the memory block.

The second area 112, according to an embodiment, may store restoration data with respect to the first data column. For example, the second area 112 may store the restoration data in preparation for the power supply to the storage device 110 being stopped and the first data column being incompletely programmed. The restoration data, according to an embodiment, may be generated through an XOR operation on the pieces of data to be written in the first data column. The first area 111 and the second area 112, according to an embodiment, may be in the same memory block or may be in different memory blocks in the storage device 110.

The processor 120, according to an embodiment, may identify a program state of the first data column programmed in a first stripe of the storage device 110 and may complete a program operation with respect to the first data column based on the program state of the first data column. For example, the processor 120 may determine whether the programming with respect to the first data column has stopped, and the processor 120 may combine the pre-stored restoration data with the first data column to generate a second data column and may program the generated second data column in a second stripe. The processor 120, according to an embodiment, may determine whether or not the programming with respect to the first data column has stopped, based on pre-configured variable data inserted in the first data column. For example, the processor 120 may determine to which position the first data column is programmed, based on a position in which the variable data included in the first data column is written. When the processor 120 determines that the programming with respect to the first data column has stopped due to the shut-off of power to the storage device 110, the processor 120, according to an embodiment, may combine the pre-stored restoration data with the first data column to generate the second data column and may program the generated second data column in the second stripe. The second stripe, according to an embodiment, may be stored in the first area 111 or may be stored in an arbitrary area other than the first area 111 (e.g., the second area 112).

When the power supply to the storage device 110 is resumed, the processor 120, according to an embodiment, may determine a program stop position with respect to the first data column. For example, when the power supply to the storage device 110 is resumed, the processor 120 may determine a stop position of the first data column that is programmed at the time point of the power shut-off and may extract, from the second area 112, restoration data with respect to data after the stop position of the first data column. The processor 120, according to an embodiment, may determine the program stop position with respect to the first data column and may add the pieces of restoration data to valid data of the first data column with respect to which the programming is completed, so as to configure the second data column. The valid data, according to an embodiment, may be pieces (e.g., at least one portion) of data of the first data column programmed in the first stripe before the power supply to the storage device 110 is stopped.

The processor 120, according to an embodiment, may configure programming information of the first data column the same as programming information of the second data column. For example, the processor 120 may restore a portion of the first data column (e.g., the portion not being programmed due to a power cut-off), and may generate the second data column to have the same information as the complete first data column. The processor 120, according to an embodiment, may store the generated second data column in a stripe different from a stripe in which the first data column is written. For example, when the program operation with respect to the first data column is stopped due to a power cut-off while the first data column is being programmed in the first stripe, the processor 120 may program the second data column having the same information as the first data column in the second stripe.

The processor 120, according to an embodiment, may generate parity data with respect to the second data column. The processor 120, according to an embodiment, may generate the parity data through an XOR operation on pieces (e.g., at least one portion) of data programmed in the second data column. As the parity data with respect to the second data column is generated, the processor 120, according to an embodiment, may restore the second data column, when part of the data included in the second data column is damaged. For example, when part of the data included in the second data column is damaged, the processor 120 may restore the second data column having the same information as the first data column and may thus keep the information provided by the first data column.

Figure 3:
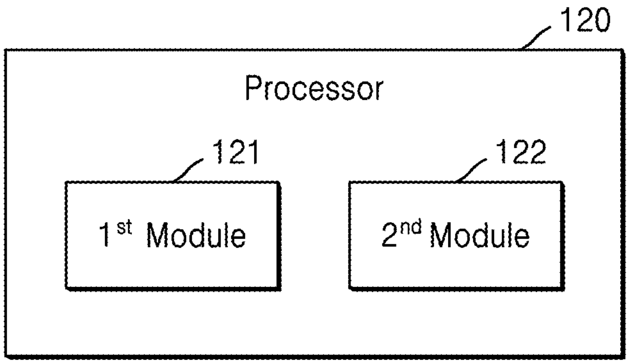
FIG. 3 is a block diagram of a processor, according to an embodiment.

FIG. 3 is a block diagram of the processor 120, according to an embodiment.

Referring to FIGS. 2 and 3, the processor 120, according to an embodiment, may include a first module 121 and a second module 122. The expressions "first" and "second" used for the first module 121 and the second module 122, according to an embodiment, distinguish between the elements included in the processor 120, and each of the elements may perform an operation of the first module 121 and/or the second module 122 as described below.

The first module 121, according to an embodiment, may identify a program state of a first data column programmed in a first stripe of the storage device 110. The first module 121, according to an embodiment, may identify the program state of the first data column programmed in the first stripe of the storage device 110 and may determine whether the programming with respect to the first data column has been completed based on the program state of the first data column. For example, the first module 121 may determine whether the programming with respect to the first data column has stopped, and the second module 122 may combine restoration data that is pre-stored with the first data column to generate a second data column and may program the generated second data column in a second stripe.

The second module 122, according to an embodiment, may complete the programming of the first data column based on the program state of the first data column. The second module 122, according to an embodiment, may combine the pre-stored restoration data with a stop portion of the first data column to generate the second data column and may program the generated second data column in the second stripe to restore the first data column.

When power supply to the storage device 110 is resumed, the second module 122, according to an embodiment, may determine a program stop position with respect to the first data column. For example, when the power supply to the storage device 110 is resumed, the second module 122 may determine a stop position of the first data column that is programmed at the time point of the power cut-off and may extract, from the second area 112, restoration data with respect to data after the program stop position of the first data column. The processor 120, according to an embodiment, may determine the program stop position with respect to the first data column and may add the pieces of restoration data to valid data of the first data column with respect to which the programming is completed, so as to configure the second data column. The valid data, according to an embodiment, may be and/or may include pieces (e.g., at least one portion) of data of the first data column programmed in the first stripe before the power supply to the storage device 110 is stopped. The second module 122, according to an embodiment, may determine the program stop position with respect to the first data column and may add the pieces of restoration data to valid data of the first data column with respect to which the programming is completed, so as to configure the second data column.

The second module 122, according to an embodiment, may determine whether or not the programming with respect to the first data column has stopped, based on pre-configured variable data inserted in the first data column. For example, the second module 122 may determine to which position the first data column is programmed, based on a position in which the variable data included in the first data column is written. When the second module 122 determines that the programming with respect to the first data column has stopped due to the shut-off of power to the storage device 110, the second module 122, according to an embodiment, may combine the pre-stored restoration data with the first data column to generate the second data column and may program the generated second data column in the second stripe. The second stripe, according to an embodiment, may be stored in the first area 111 or may be stored in an arbitrary area other than the first area 111.

The second module 122, according to an embodiment, may configure programming information of the first data column to be the same as programming information of the second data column. For example, the second module 122 may restore a portion of the first data column (e.g., the portion not being programmed due to a power cut-off), and may generate the second data column to have the same information as the complete first data column. The second module 122, according to an embodiment, may store the generated second data column in a stripe different from a stripe in which the first data column is written. For example, when the program operation with respect to the first data column is stopped due to a power cut-off while the first data column is being programmed in the first stripe, the second module 122 may program the second data column having the same information as the first data column in the second stripe.

The second module 122, according to an embodiment, may generate parity data with respect to the second data column. The second module 122, according to an embodiment, may generate the parity data through an XOR operation on pieces (e.g., at least one portion) of data programmed in the second data column. As the parity data with respect to the second data column is generated, the second module 122, according to an embodiment, may restore the second data column, when part of the data included in the second data column is damaged. For example, when part of the data included in the second data column is damaged, the second module 122 may restore the second data column having the same information as the first data column, and as such, may keep the information provided by the first data column.

Figure 4A:
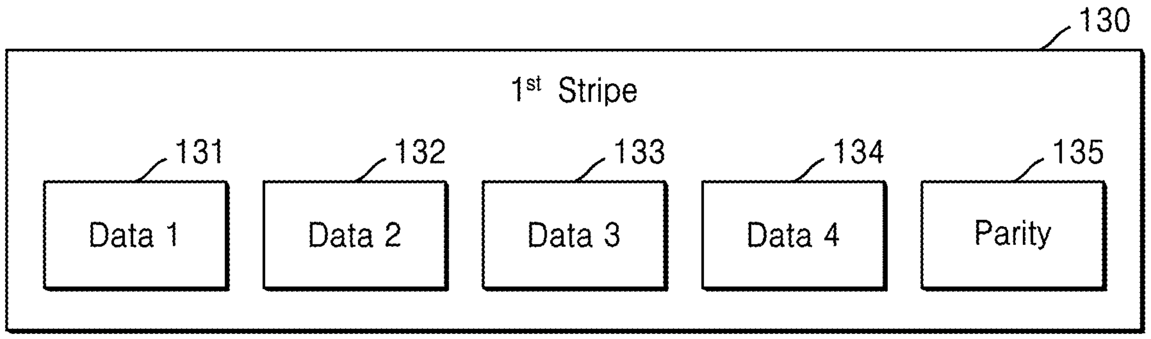
FIGS. 4A to 4C are views of a data stripe, according to an embodiment.
Figure 4B:
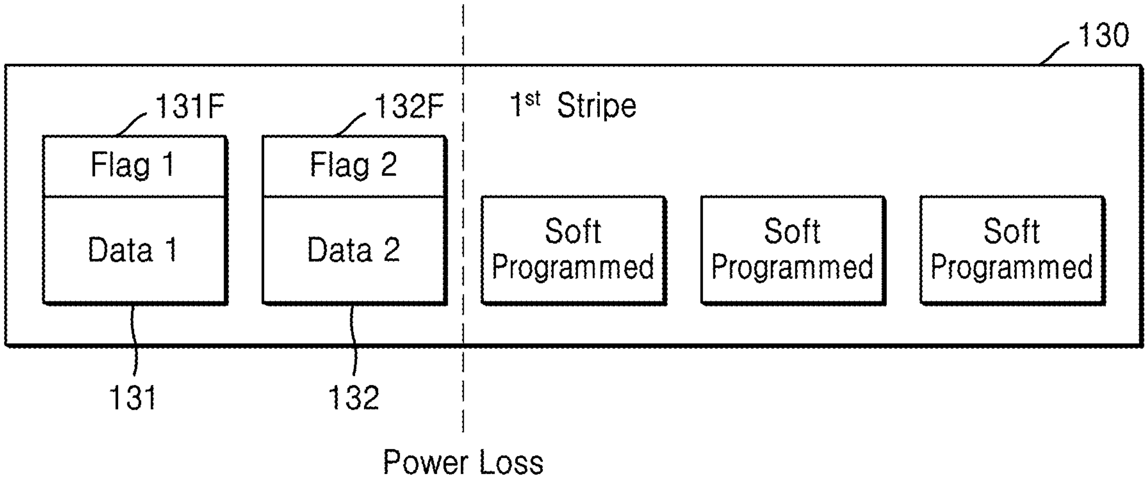
Figure 4C:
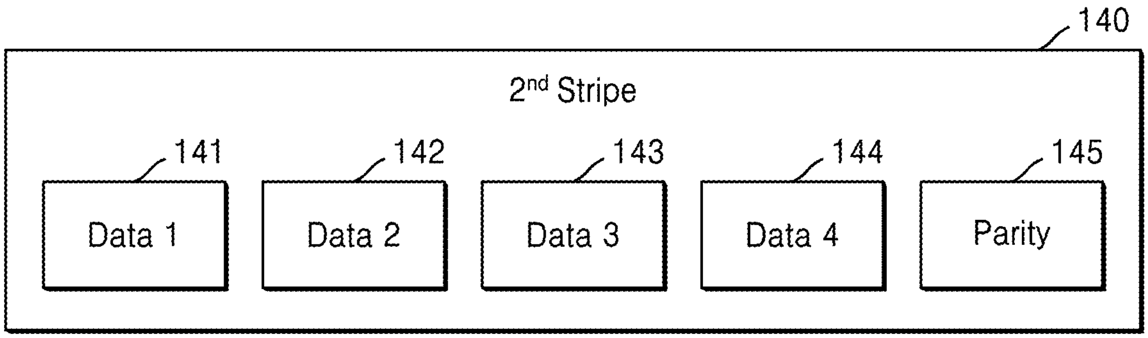

FIGS. 4A to 4C are views of a data stripe, according to an embodiment. FIG. 4A illustrates a first stripe 130 in which a first data column is completely programmed, according to an embodiment. FIG. 4B illustrates the first stripe 130 in which the first data column is incompletely programmed, according to an embodiment. FIG. 4C illustrates a second stripe 140 in which a second data column is programmed, according to an embodiment.

Referring to FIGS. 2 and 4A, the first stripe 130 in which the first data column is completely programmed may include first data 131, second data 132, third data 133, fourth data 134, and a parity bit 135. When there is no power cut-off while the first data column is being programmed, the data in the first data column may be completely programmed in the first stripe 130 and the parity bit 135 may be generated. When the parity bit 135 with respect to the first data column is generated, the memory device 100, according to an embodiment, may not generate a second data column and may restore the first data column, when some pieces of the data of the first data column are damaged.

Referring to FIGS. 2 and 4B, when power loss occurs while the first data column, according to an embodiment, is being programmed in the first stripe 130, some of the data of the first data column may not be written. For example, when the power loss occurs while the first data column is being programmed in the first stripe 130, only the first data 131 and the second data 132 may be programmed from among the data of the first data column and the data supposed to be written after the second data 132 may be soft programmed (e.g., third data 133, fourth data 134, and parity bit 135). A soft programmed state, according to an embodiment, may refer to a state in which data supposed to be written is not written.

The processor 120, according to an embodiment, may determine whether or not the programming with respect to the first data column has stopped, based on pre-configured variable data inserted in the first data column. For example, the processor 120 may determine to which position the first data column is programmed, based on a position in which the variable data included in the first data column is written. For example, the variable data may be and/or may include flag data inserted in each piece of the data. The variable data of the first data 131, according to an embodiment, may be and/or may include first flag data 131F. The variable data of the second data 132, according to an embodiment, may be and/or may include second flag data 132F. The memory device 100, according to an embodiment, may identify the flag data inserted in each piece of the data and may determine written data. For example, when power loss occurs and the first flag data 131F and the second flag data 132F are identified, the memory device 100 may determine that only the first data 131 and the second data 132 are normally programmed.

However, data not written due to the power loss occurring in the storage device 110 is not limited thereto, and a plurality of pieces of data may be further written or may not be written according to the time point of the power loss.

Referring to FIGS. 2 and 4C, the second stripe 140 in which the second data column is written may include first data 141, second data 142, third data 143, fourth data 134, and a parity bit 145. The data of the second data column, according to an embodiment, may be the same as the data of the first data column completely programmed in FIG. 4A. The second data column, according to an embodiment, may be generated by combining restoration data with a program stop position of the first data column incompletely programmed in FIG. 4B. For example, the second data column, according to an embodiment, of FIG. 4C may be generated by combining the third data 143, the fourth data 144, and the parity bit 145 with the first data column, with reference to FIG. 4B.

Figure 5:
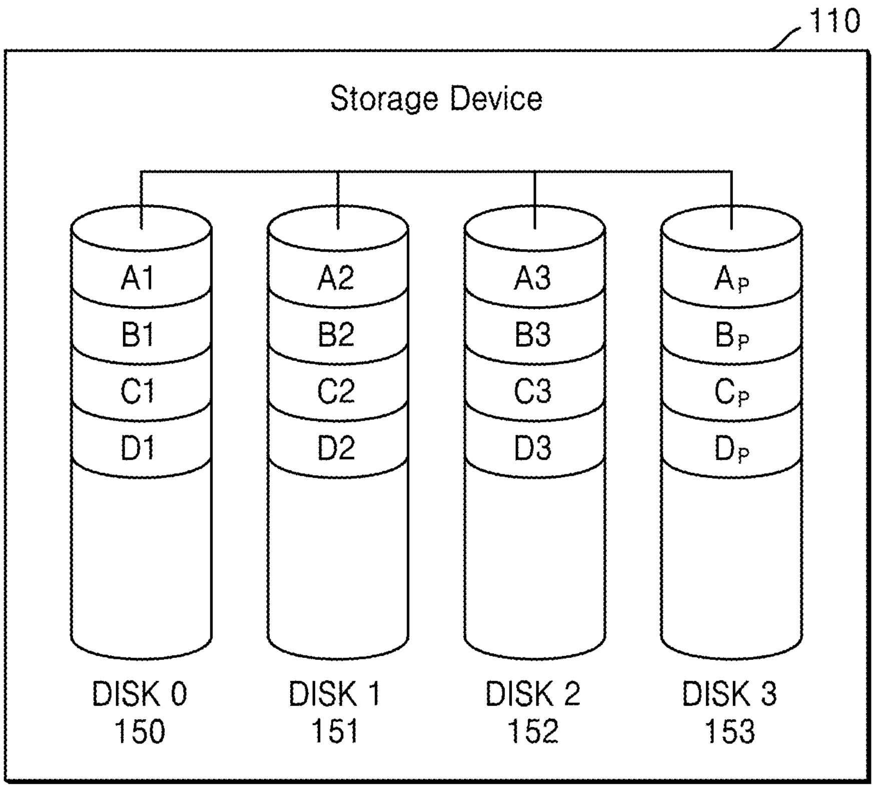
FIG. 5 is a view of a storage device, according to an embodiment.

FIG. 5 is a view of the storage device 110, according to an embodiment.

Referring to FIG. 5, the storage device 110, according to an embodiment, may include a first disk 150, a second disk 151, a third disk 152, and a fourth disk 153. However, the storage device 110 illustrated in FIG. 5 is only a non-limiting example, and the storage device 110 which may be included in the memory device 100, according to the present disclosure, may further include a plurality of disks. That is, the memory device 100 may include fewer (e.g., less than four (4)) disks or more (e.g., more than four (4)) disks.

Each of the disks included in the first to fourth disks 150 to 153, according to an embodiment, may be formed as a redundant array of independent disks (e.g., redundant array of independent disks (RAID)). For example, each of the disks included in the first to fourth disks 150 to 153 may store data into a plurality of divided storage areas.

For example, the first disk 150 may include a first storage area A1, a second storage area B1, a third storage area C1, and a fourth storage area D1, the second disk 151 may include a first storage area A2, a second storage area B2, a third storage area C2, and a fourth storage area D2, and the third disk 152 may include a first storage area A3, a second storage area B3, a third storage area C3, and a fourth storage area D3. In each of the storage areas included in the first to third disks 150 to 152, a plurality of data columns may be programmed. However, the storage areas included in the storage device 110 are not limited thereto, and the storage device 110 may further include a plurality of disks and a plurality of storage areas. That is, the storage device 110 may include fewer (e.g., less than four (4)) disks or more (e.g., more than four (4)) disks. Alternatively or additionally, each disk of the storage device 110 may include fewer (e.g., less than four (4)) storage areas or more (e.g., more than four (4)) storage areas, and/or the number of storage areas of the disks may be different.

The fourth disk 153, according to an embodiment, may store parity data. For example, the memory device 100 may designate the fourth disk 153 in the storage device 110 as an area to store the parity data. The fourth disk 153, according to an embodiment, may include a first parity area $A_P$, a second parity area $B_P$, a third parity area $C_P$, and a fourth parity area $D_P$. The parity areas included in the fourth disk 153 may store parity data with respect to the data programmed in the storage areas of the first to third disks 150 to 152. For example, the processor 120 of FIGS. 2 and 3 may perform a predetermined operation on the data programmed in the storage areas of the first to third disks 150 to 152 and may store logic values derived as a result of the operation as the parity data in a corresponding parity area of the fourth disk 153. The pre-determined operation, according to an embodiment, may be and/or may include an XOR operation on the data stored in the storage areas of the first to third disks 150 to 152. However, the pre-determined operation is not limited thereto, and the parity data may be generated by other logic operations.

The storage device 110, according to an embodiment, may be formed as a RAID including the plurality of storage areas, and thus, the memory device 100 may write a plurality of data columns in a plurality of stripes.

Figure 6:
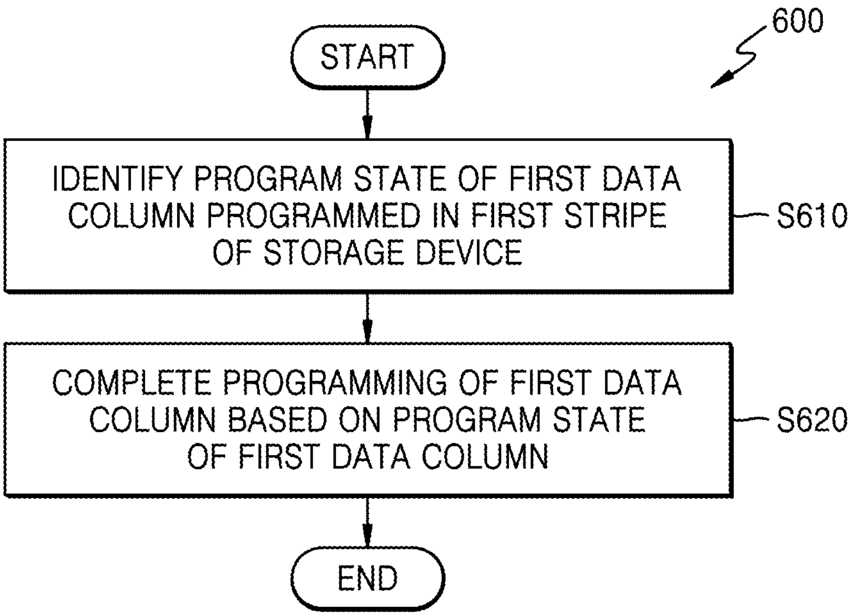
FIG. 6 is a flowchart of an operating method of a memory device, according to an embodiment.

FIG. 6 is a flowchart of an operating method 600 of a memory device, according to an embodiment.

Referring to FIGS. 2 and 6, the memory device 100, according to an embodiment, may identify a program state of a first data column programmed in a first stripe of the storage device 110, in operation S610.

For example, when there is a power cut-off while the first data column is being programmed in a first area of the storage device 110 of the memory device 100, the memory device 100 may determine whether or not data included in the first data column is normally written.

When a program state of the first data column is identified, the memory device 100, according to an embodiment, may complete a program operation of the first data column based on the program state of the first data column, in operation S620.

For example, when there is a power cut-off, the memory device 100 may determine whether the programming with respect to the first data column has stopped. When the memory device 100 determines that the programming with respect to the first data column has not been completely performed, the memory device 100, according to an embodiment, may generate a second data column by combining pre-stored restoration data with the first data column. The memory device 100, according to an embodiment, may store the second data column in an area different from an area in which the first data column is written. For example, the memory device 100 may write the second data column in a second stripe, when power supply is blocked while the first data column is being written in a first stripe. That is, the memory device 100 may write a data column in which the first data column is restored in the second stripe as the second data column. A stripe, according to an embodiment, may be and/or may include a programming unit with respect to a nonvolatile memory device. Alternatively or additionally, the first stripe may be and/or may include an area in which the first data column is written and the second stripe may be and/or may include an area in which the second data column is written.

Figure 7:
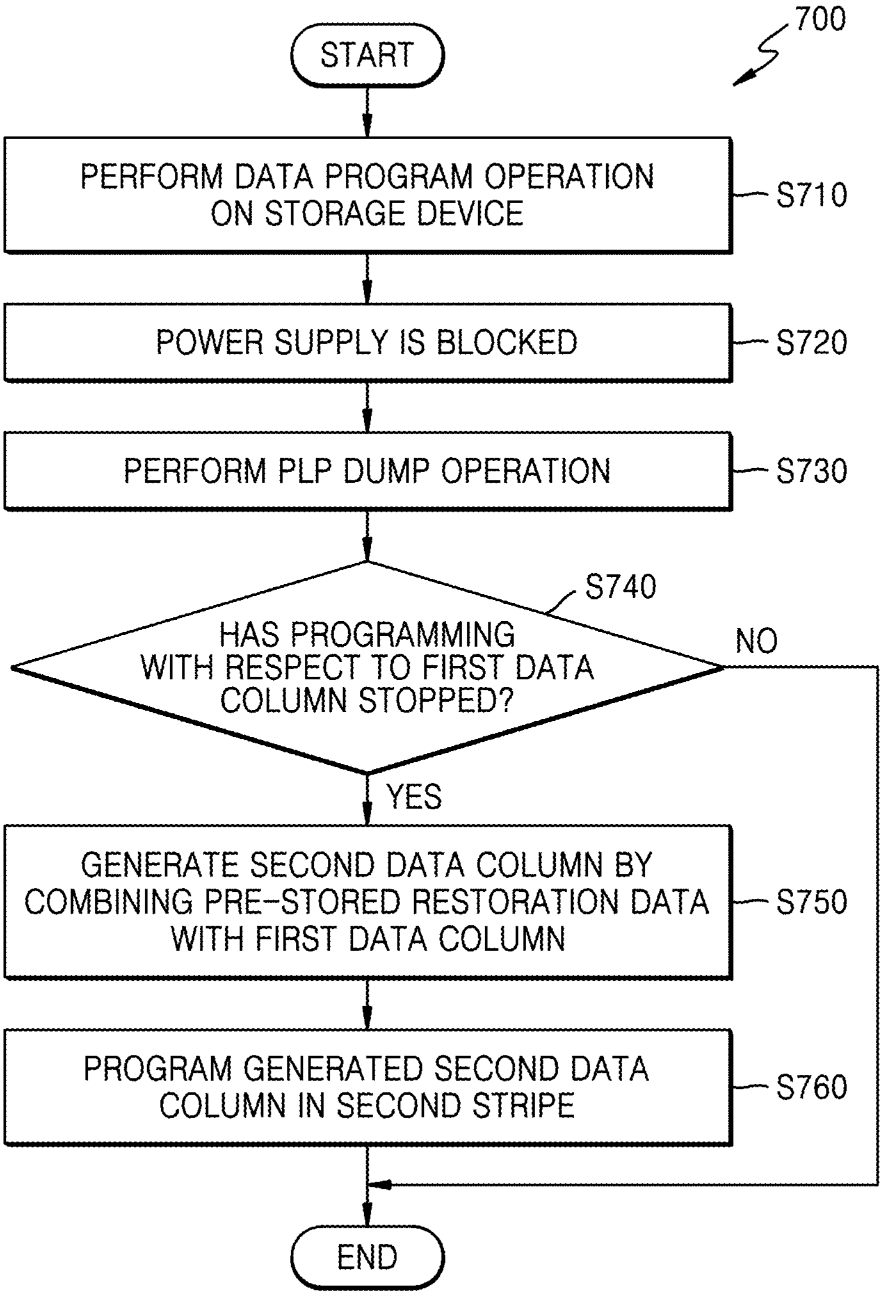
FIG. 7 is a flowchart of restoration of a first data column in an operating method of a memory device, according to an embodiment.

FIG. 7 is a flowchart of restoration of a first data column in an operating method 700 of a memory device, according to an embodiment.

Referring to FIGS. 2 and 7, the memory device 100, according to an embodiment, may perform a data program operation on the storage device 110 in operation S710. A program operation of the memory device 100, according to an embodiment, may be and/or may include a data write operation on the storage device 110. The storage device 110 may be and/or may include a memory block included in the memory device 100 or a portion of the memory block.

While a data program operation is being performed, a power cut-off may occur to the storage device 110 of the memory device 100 in operation S720. The power cut-off, according to an embodiment, may include both a power cut-off to a portion of the storage device 110 included in the memory device 100 and a power cut-off to the entire storage device 110 included in the memory device 100. Alternatively or additionally, the power cut-off may include a case where power supply required by the storage device 110 is not smoothly provided.

When power supply to the storage device 110 is blocked, the memory device 100, according to an embodiment, may perform a PLP DUMP operation in operation S730. The PLP DUMP operation, according to an embodiment, may be and/or may include an operation of restoring data by combining pre-stored restoration data with data that has been programmed.

The memory device 100, according to an embodiment, may store restoration data with respect to the first data column. For example, the memory device 100 may store the restoration data in preparation for the power supply to the storage device 110 being stopped and/or the first data column being incompletely programmed. The restoration data, according to an embodiment, may be generated through an XOR operation on the pieces of data to be written in the first data column.

When the PLP DUMP operation is performed, the memory device 100, according to an embodiment, may determine whether programming with respect to the first data column has stopped, in operation S740.

The memory device 100, according to an embodiment, may identify a program state of the first data column programmed in a first stripe of the storage device 110 and may complete a program operation with respect to the first data column based on the program state of the first data column. The memory device 100, according to an embodiment, may determine whether or not the programming with respect to the first data column has stopped, based on pre-configured variable data inserted in the first data column. For example, the memory device 100 may determine to which position the first data column is programmed, based on a position in which the variable data included in the first data column is written.

When the memory device 100 determines that the programming with respect to the first data column has stopped (YES in operation S740), the memory device 100, according to an embodiment, may generate a second data column by combining pre-stored restoration data with the first data column, in operation S750. When the memory device 100 determines that the programming with respect to the first data column has stopped due to the shut-off of power to the storage device 110, the memory device 100, according to an embodiment, may combine the pre-stored restoration data with the first data column to generate the second data column and may program the generated second data column in the second stripe.

However, when the memory device 100 determines that the programming with respect to the first data column has not stopped (NO in operation S740), the memory device 100, according to an embodiment, may not generate the second data column and may terminate the PLP DUMP operation.

When the second data column is generated, the memory device 100, according to an embodiment, may program the generated second data column in the second stripe in operation S760. The memory device 100, according to an embodiment, may generate the second data column by combining the pre-stored restoration data with the first data column. The memory device 100, according to an embodiment, may store the second data column in an area different from an area in which the first data column is written. For example, the memory device 100 may write the second data column in a second stripe, when power supply is blocked while the first data column is being written in a first stripe. A stripe, according to an embodiment, may be and/or may include a programming unit with respect to a nonvolatile memory device. Alternatively or additionally, the first stripe may be and/or may include an area in which the first data column is written and the second stripe may be and/or may include an area in which the second data column is written.

That is, the memory device 100 may write a data column in which the first data column is restored in the second stripe as the second data column.

Figure 8:
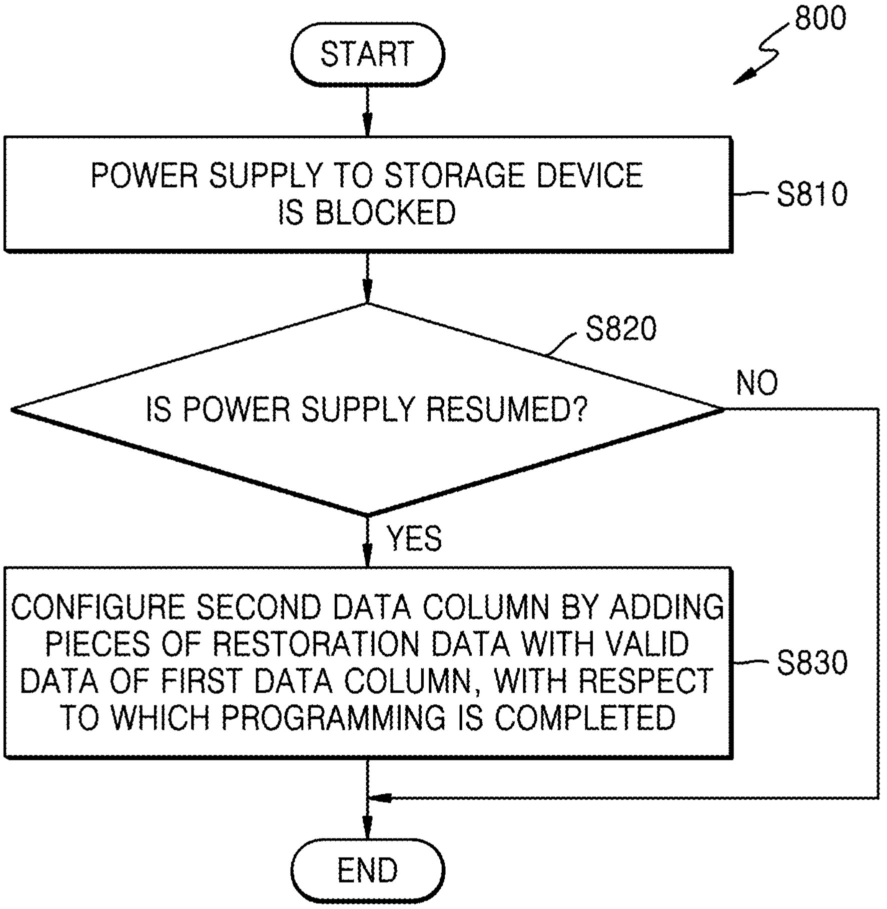
FIG. 8 is a flowchart of a case where a power supply is resumed in an operating method of a memory device, according to an embodiment.

FIG. 8 is a flowchart of a case where a power supply is resumed in an operating method 800 of a memory device, according to an embodiment.

Referring to FIGS. 2 and 8, power supply to the storage device 110 of the memory device 100, according to an embodiment, may be blocked in operation S810. The power cut-off, according to an embodiment, may include both a power cut-off occurring in a portion of the storage device 110 included in the memory device 100 and a power cut-off entirely occurring in the storage device 110 included in the memory device 100. Alternatively or additionally, the power cut-off may include a case where power supply required by the storage device 110 is not smoothly provided.

When the memory device 100 determines that the power supply to the storage device 110 is blocked, the memory device 100, according to an embodiment, may determine whether or not power supply is resumed, in operation S820. The resumption of power supply, according to an embodiment, may be a case where power supply required by the storage device 110 is provided.

When the memory device 100 determines that the power supply is resumed (YES in operation S820), the memory device 100, according to an embodiment, may configure a second data column by adding pieces of restoration data to valid data of the first data column completely programmed, in operation S830.

When the power supply to the storage device 110 is resumed, the memory device 100, according to an embodiment, may determine a program stop position with respect to the first data column. For example, when the power supply to the storage device 110 is resumed, the memory device 100 may determine a stop position of the first data column that is programmed at the time point of the power shut-off and may extract restoration data with respect to data after the stop position of the first data column. The processor 120, according to an embodiment, may determine the program stop position with respect to the first data column and may add the pieces of restoration data to valid data of the first data column with respect to which the programming is completed, so as to configure the second data column. The valid data, according to an embodiment, may be and/or may include pieces (e.g., at least one portion) of data of the first data column programmed in the first stripe before the power supply to the storage device 110 is stopped.

However, when the memory device 100 determines that the power supply is not resumed (NO in operation S820), the memory device 100, according to an embodiment, may not determine the program stop position of the first data column and may only recognize a program stop state.

Figure 9:
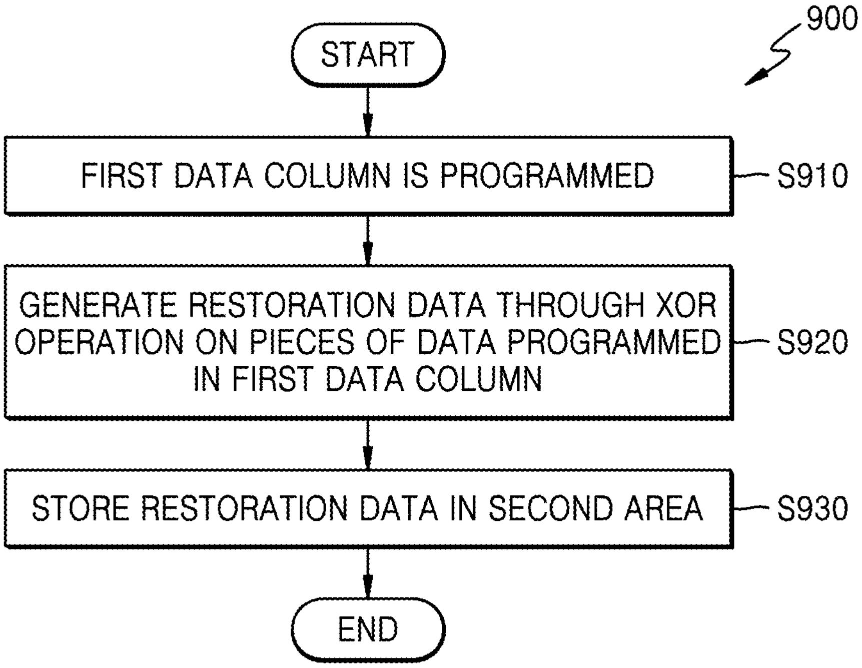
FIG. 9 is a flowchart of generation of restoration data in an operating method of a memory device, according to an embodiment.

FIG. 9 is a flowchart of generation of restoration data in an operating method of the memory device 100, according to an embodiment.

Referring to FIGS. 2 and 9, a first data column may be programmed in the memory device 100 in operation S910, according to an embodiment. The memory device 100, according to an embodiment, may program the first data column in a first area. The first area may be and/or may include a storage area in which the first data column is written.

The memory device 100, according to an embodiment, may generate restoration data through an XOR operation on pieces (e.g., at least one portion) of data programmed in the first data column, in operation S920. For example, the memory device 100 may generate the restoration data in advance based on information of the first data column.

When power supply to the storage device 110 is blocked and then resumed, the memory device 100, according to an embodiment, may generate a second data column and may generate restoration data with respect to the second data column. For example, the memory device 100 may generate parity data with respect to the second data column to restore information included in the first data column and may complete the programming with respect to the first data column.

When the restoration data is generated, the memory device 100, according to an embodiment, may store the restoration data in a second area in operation S930. The second area, according to an embodiment, may be where the restoration data or the parity data is stored.

The memory device 100, according to an embodiment, may generate the parity data through an XOR operation on pieces (e.g., at least one portion) of data programmed in the second data column and may store the generated parity data as the restoration data.

Figure 10:
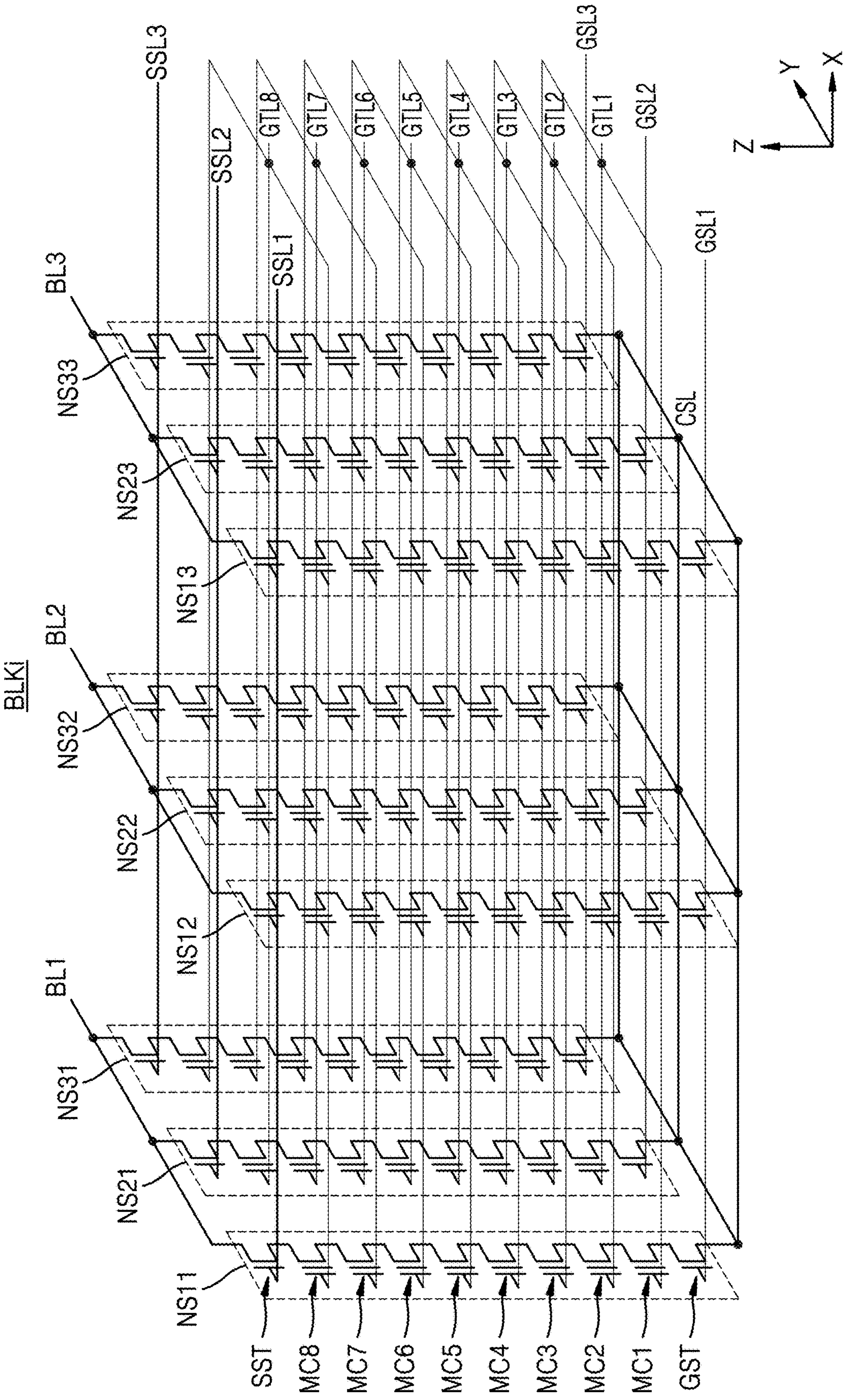
FIGS. 10 to 12 are views of a three-dimensional (3D) vertical NAND (V-NAND) structure which may be implemented in a memory device, according to an embodiment.
Figure 11:
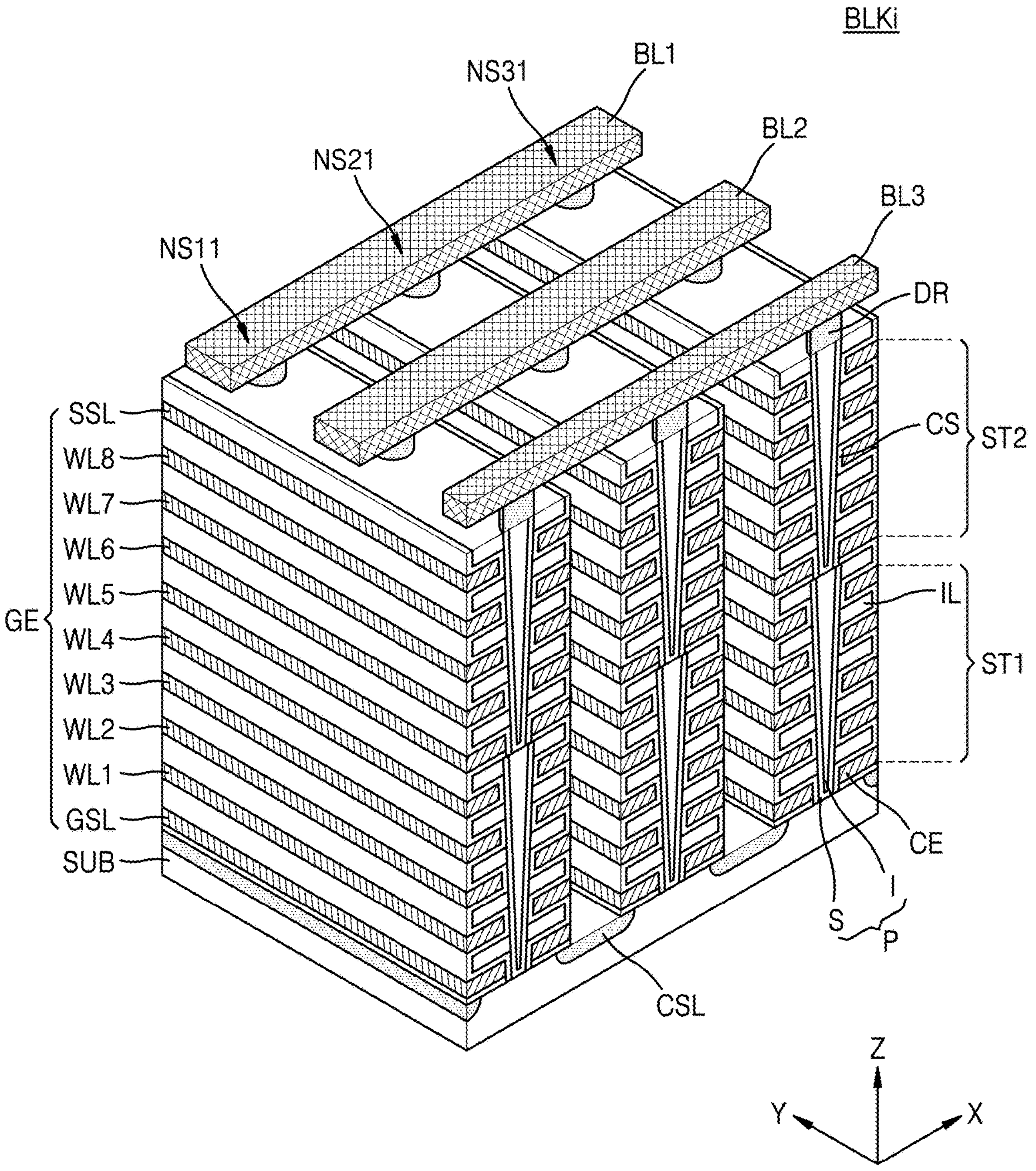
Figure 12:
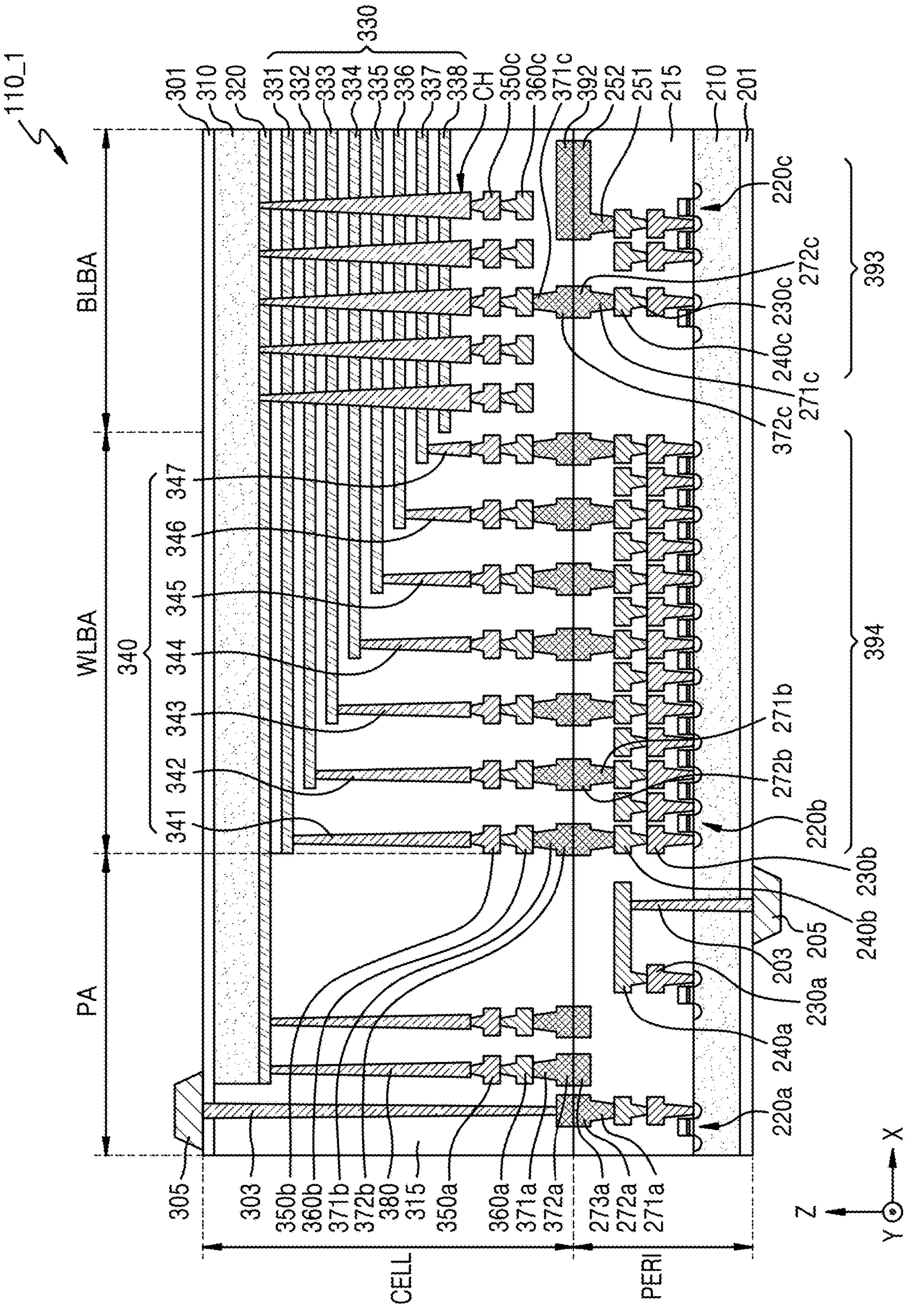

FIGS. 10 to 12 are views of a three-dimensional (3D) vertical NAND (V-NAND) structure which may be implemented in a memory device, according to an embodiment.

The storage device 110 of the memory device 100 may be implemented as a first non-volatile memory (NVM) 110_1, according to an embodiment. The first NVM 110_1 may be and/or may include a plurality of memory blocks BLK. FIGS. 10 and 11 illustrate a structure of any one memory block BLKi from among the plurality of memory blocks BLK of the first NVM 110_1. FIG. 12 illustrates a cross-sectional view of an embodiment of the first NVM 110_1.

Referring to FIG. 10, the memory block BLKi may include a plurality of memory NAND strings (e.g., a first NAND string NS11, a second NAND string NS21, a third NAND string NS31, a fourth NAND string NS12, a fifth NAND string NS22, a sixth NAND string NS32, a seventh NAND string NS13, an eighth NAND string NS23, and a ninth NAND string NS33) connected between bit lines (e.g., first bit line BL1, second bit line BL2, and third bit line BL3) and a common source line CSL. Each of the plurality of memory NAND strings NS11 to NS33 may include a string select transistor SST, a plurality of memory cells (e.g., a first memory cell MC1, a second memory cell MC2, a third memory cell MC3, a fourth memory cell MC4, a fifth memory cell MC5, a sixth memory cell MC6, a seventh memory cell MC7, and an eighth memory cell MC8), and a ground select transistor GST. For brevity of drawings, FIG. 10 illustrates that each of the plurality of memory NAND strings NS11 to NS33 includes first to eighth memory cells MC1 to MC8. However, the present disclosure is not necessarily limited thereto.

The string select transistor SST may be connected to a corresponding string select line (e.g., a first select line SSL1, a second select line SSL2, or a third select line SSL3). The plurality of memory cells MC1 to MC8 may be respectively connected to gate lines (e.g., a first gate line GTL1, a second gate line GTL2, a third gate line GTL3, a fourth gate line GTL4, a fifth gate line GTL5, a sixth gate line GTL6, a seventh gate line GTL7, and an eighth gate line GTL8) corresponding thereto. The first to eighth gate lines GTL1 to GTL8 may correspond to word lines, and some of the first to eighth gate lines GTL1 to GTL8 may correspond to dummy word lines. The ground select transistor GST may be connected to a corresponding ground select line (e.g., a first ground select line GSL1, a second ground select line GSL2, or a third ground select line GSL3). The string select transistor SST may be connected to a corresponding bit line of the first to third bit lines BL1 to BL3, and the ground select transistor GST may be connected to the common source line CSL.

The gate line (e.g., the first gate line GTL1) at the same height may be commonly connected, and each of the first to third ground select transistors GSL1 to GSL3 and the first to third string select lines SSL1 to SSL3 may be disconnected. FIG. 10 illustrates that the memory block BLKi may be connected to the first to eighth gate lines GTL1 to GTL8 and the first to third bit lines BL1 to BL3. However, the present disclosure is not necessarily limited thereto.

Further referring to FIG. 11, the memory block BLKi may be formed in a direction perpendicular to a substrate SUB. Memory cells forming the plurality of memory NAND strings NS11 to NS33 may be stacked on a plurality of semiconductor layers.

The common source line CSL extending in a first direction (e.g., a Y direction) may be provided on the substrate SUB. Between two adjacent common source lines CSL on the substrate SUB, a plurality of insulating layers IL extending in the first direction (the Y direction) may be sequentially provided in a third direction (e.g., a Z direction), wherein the plurality of insulating layers IL may be spaced apart from each other in the third direction (the Z direction) by a predetermined distance. Between two adjacent common source lines CSL on the substrate SUB, a plurality of pillars P sequentially arranged in the first direction (the Y direction) and passing through the plurality of insulating layers IL in the third direction (the Z direction) may be provided. The plurality of pillars P may contact the substrate SUB by passing through the plurality of insulating layers IL. A surface layer S of each pillar P may include a silicon (Si) material doped with a first conductivity type and may function as a channel region.

An inner layer I of each pillar P may include an insulating material, such as, but not limited to, silicon oxide (SiO), or an air gap. Between two adjacent common source lines CSL, a charge storage layer CS may be provided along exposed surfaces of the insulating layers IL, the pillars P, and the substrate SUB. The charge storage layer CS may include a gate insulating layer (or a tunneling insulating layer), a charge trap layer, and a blocking insulating layer. Alternatively or additionally, between two adjacent common source lines CSL, a gate electrode GE, such as the ground select line GSL, the string select line SSL, and word lines (e.g., a first word line WL1, a second word line WL2, a third word line WL3, a fourth word line WL4, a fifth word line WL5, a sixth word line WL6, a seventh word line WL7, and an eighth word line WL8), may be provided on an exposed surface of the charge storage layer CS. Drains and drain contacts DR may be provided on each of the plurality of pillars P. The first to third bit lines BL1 to BL3 extending in a second direction (e.g., an X direction) and arranged to be spaced apart from each other by a predetermined distance in the first direction (the Y direction) may be provided on the drains or drain contacts DR.

As illustrated in FIG. 11, each of the plurality of memory NAND strings NS11 to NS33 may be realized as a structure in which a first memory stack ST1 and a second memory stack ST2 are stacked. The first memory stack ST1 may be connected to the common source line CSL, the second memory stack ST2 may be connected to the first to third bit lines BL1 to BL3, and the first memory stack ST1 and the second memory stack ST2 may be stacked to share a channel hole.

FIG. 12 is a diagram illustrating a cross-sectional view the first NVM 110_1, according to an embodiment.

Referring to FIG. 12, the first NVM 110_1 may have a chip-to-chip (C2C) structure. The C2C structure may refer to a structure formed by manufacturing an upper chip including a cell region CELL on a first wafer, manufacturing a lower chip including a peripheral circuit region PERI on a second wafer, separate from the first wafer, and then bonding the upper chip and the lower chip to each other. The bonding process may include a method of electrically connecting a bonding metal formed on an uppermost metal layer of the upper chip and a bonding metal formed on an uppermost metal layer of the lower chip. For example, when the bonding metals include copper (Cu), the bonding process may be referred to as a Cu-to-Cu bonding. The example embodiment, however, may not be limited thereto. For example, the bonding metals may also be formed of, but not limited to, aluminum (Al), tungsten (W), or the like.

Each of the peripheral circuit region PERI and the cell region CELL of the first NVM 110_1 may include an external pad bonding area PA, a word line bonding area WLBA, and a bit line bonding area BLBA.

The peripheral circuit region PERI may include a first substrate 210, an interlayer insulating layer 215, a plurality of circuit elements (e.g., a first circuit element 220*a*, a second circuit element 220*b*, and a third circuit element 220*c*) formed on the first substrate 210, first metal layers (e.g., a first metal layer 230*a*, a second metal layer 230*b*, and a third metal layer 230*c*) respectively connected to the plurality of circuit elements 220*a* to 220*c*, and second metal layers (e.g., a fourth metal layer 240*a*, a fifth metal layer 240*b*, and a sixth metal layer 240*c*) formed on the first metal layers 230*a* to 230*c*. In an example embodiment, the first metal layers 230*a* to 230*c* may be formed of tungsten (W) having a relatively high electrical resistivity and the second metal layers 240*a* to 240*c* may be formed of copper (Cu) having a relatively low electrical resistivity.

In an example embodiment illustrated in FIG. 12, although only the first metal layers 230*a* to 230*c* and the second metal layers 240*a* to 240*c* are shown and described, the example embodiment is not limited thereto, and one or more additional metal layers may be further formed on the second metal layers 240*a* to 240*c*. At least a portion of the one or more additional metal layers formed on the second metal layers 240*a* to 240*c* may be formed of aluminum (Al) or the like having a lower electrical resistivity than those of the copper (Cu) forming the second metal layers 240*a* to 240*c*.

The interlayer insulating layer 215 may be disposed on the first substrate 210 and at least partially cover the plurality of circuit elements 220*a* to 220*c*, the first metal layers 230*a* to 230*c*, and the second metal layers 240*a* to 240*c*. The interlayer insulating layer 215 may include an insulating material such as, but not limited to, silicon oxide (SiO), silicon nitride (SiN), or the like.

Lower bonding metals (e.g., a first lower bonding metal 271*b* and a second 272*b*) may be formed on the fifth metal layer 240*b* in the word line bonding area WLBA. In the word line bonding area WLBA, the first and second lower bonding metals 271*b* and 272*b* in the peripheral circuit region PERI may be electrically bonded to upper bonding metals (e.g., a first upper bonding metal 371*b* and a second upper bonding metal 372*b*) of the cell region CELL. The first and second lower bonding metals 271*b* and 272*b* and the first and second upper bonding metals 371*b* and 372*b* may be formed of, but not limited to, aluminum (Al), copper (Cu), tungsten (W), or the like. Furthermore, the first and second upper bonding metals 371*b* and 372*b* in the cell region CELL may be referred to as first metal pads and the first and second lower bonding metals 271*b* and 272*b* in the peripheral circuit region PERI may be referred to as second metal pads.

The cell region CELL may include at least one memory block. The cell region CELL may include a second substrate 310 and a common source line 320. On the second substrate 310, a plurality of word lines (e.g., a first word line 331, a second word line 332, a third word line 333, a fourth word line 334, a fifth word line 335, a sixth word line 336, a seventh word line 337, and an eighth word 338, hereinafter referred to as "330") may be stacked in a direction (e.g., a Z-axis direction) perpendicular to an upper surface of the second substrate 310. At least one string select line and at least one ground select line may be arranged on and below the plurality of word lines 330, respectively, and the plurality of word lines 330 may be disposed between the at least one string select line and the at least one ground select line.

In the bit line bonding area BLBA, a channel structure CH may extend in a direction (e.g., a Z-axis direction) perpendicular to the upper surface of the second substrate 310, and pass through the plurality of word lines 330, the at least one string select line, and the at least one ground select line. The channel structure CH may include a data storage layer, a channel layer, a buried insulating layer, and the like, and the channel layer may be electrically connected to a first metal layer 350*c* and a second metal layer 360*c*. For example, the first metal layer 350*c* may be and/or may include a bit line contact, and the second metal layer 360*c* may be and/or may include a bit line. In an example embodiment, the bit line 360*c* may extend in a first direction (e.g., a Y-axis direction) parallel to the upper surface of the second substrate 310.

In an example embodiment illustrated in FIG. 12, an area in which the channel structure CH, the bit line 360*c*, and the like are disposed may be referred to as the bit line bonding area BLBA. In the bit line bonding area BLBA, the bit line 360*c* may be electrically connected to the third circuit element 220*c* providing a page buffer 393 in the peripheral circuit region PERI. The bit line 360*c* may be connected to upper bonding metals (e.g., a first upper bonding metal 371*c* and a second upper bonding metal 372*c*) in the cell region CELL, and the first and second upper bonding metals 371*c* and 372*c* may be connected to lower bonding metals (e.g., a first lower bonding metal 271*c* and a second lower bonding metal 272*c*) connected to the third circuit element 220*c* of the page buffer 393.

In the word line bonding area WLBA, the plurality of word lines 330 may extend in a second direction (e.g., an X-axis direction) parallel to the upper surface of the second substrate 310 and perpendicular to the first direction, and may be connected to a plurality of cell contact plugs (e.g., a first cell contact plug 341, a second cell contact plug 342, a third cell contact plug 343, a fourth cell contact plug 344, a fifth cell contact plug 345, a sixth cell contact plug 346, and a seventh cell contact plug 347, hereinafter referred to as "340"). The plurality of word lines 330 and the plurality of cell contact plugs 340 may be connected to each other in pads provided by at least a portion of the plurality of word lines 330 extending in different lengths in the second direction. A first metal layer 350*b* and a second metal layer 360*b* may be sequentially connected to an upper portion of the plurality of cell contact plugs 340 connected to the plurality of word lines 330. The plurality of cell contact plugs 340 may be connected to the peripheral circuit region PERI by the first and second upper bonding metals 371*b* and 372*b* of the cell region CELL and the first and second lower bonding metals 271*b* and 272*b* of the peripheral circuit region PERI in the word line bonding area WLBA.

The plurality of cell contact plugs 340 may be electrically connected to the second circuit element 220*b* forming a row decoder 394 in the peripheral circuit region PERI. In an example embodiment, operating voltages of the second circuit element 220*b* of the row decoder 394 may be different than operating voltages of the third circuit element 220*c* forming the page buffer 393. For example, operating voltages of the third circuit element 220*c* forming the page buffer 393 may be greater than operating voltages of the second circuit element 220*b* forming the row decoder 394.

A common source line contact plug 380 may be disposed in the external pad bonding area PA. The common source line contact plug 380 may be formed of a conductive material such as a metal, a metal compound, polysilicon, or the like and may be electrically connected to the common source line 320. A first metal layer 350*a* and a second metal layer 360*a* may be sequentially stacked on an upper portion of the common source line contact plug 380. For example, an area in which the common source line contact plug 380, the first metal layer 350*a*, and the second metal layer 360*a* are disposed may be referred to as the external pad bonding area PA.

Input-output (I/O) pads (e.g., a first I/O pad 205 and a second I/O pad 305) may be disposed in the external pad bonding area PA. Referring to FIG. 12, a lower insulating film 201 covering a lower surface of the first substrate 210 may be formed below the first substrate 210, and the first I/O pad 205 may be formed on the lower insulating film 201. The first I/O pad 205 may be connected to at least one of the plurality of circuit elements 220*a* to 220*c* disposed in the peripheral circuit region PERI through a first I/O contact plug 203 and may be separated from the first substrate 210 by the lower insulating film 201. In addition, a side insulating film may be disposed between the first I/O contact plug 203 and the first substrate 210 to electrically separate the first I/O contact plug 203 and the first substrate 210.

Referring to FIG. 12, an upper insulating film 301 covering the upper surface of the second substrate 310 may be formed on the second substrate 310, and the second I/O pad 305 may be disposed on the upper insulating layer 301. The second I/O pad 305 may be connected to at least one of the plurality of circuit elements 220*a* to 220*c* disposed in the peripheral circuit region PERI through a second I/O contact plug 303. In the example embodiment, the second I/O pad 305 may be electrically connected to the first circuit element 220*a*.

According to embodiments, the second substrate 310 and the common source line 320 may not be disposed in an area in which the second I/O contact plug 303 is disposed. Alternatively or additionally, the second I/O pad 305 may not overlap the word lines 330 in the third direction (the Z-axis direction). Referring to FIG. 12, the second I/O contact plug 303 may be separated from the second substrate 310 in a direction, parallel to the upper surface of the second substrate 310, and may pass through the interlayer insulating layer 315 of the cell region CELL to be connected to the second I/O pad 305.

According to embodiments, the first I/O pad 205 and the second I/O pad 305 may be selectively formed. For example, the first NVM 110_1 may include only the first I/O pad 205 disposed on the first substrate 210 or the second I/O pad 305 disposed on the second substrate 310. Alternatively or additionally, the first NVM 110_1 may include both the first I/O pad 205 and the second I/O pad 305.

A metal pattern provided on an uppermost metal layer may be provided as a dummy pattern or the uppermost metal layer may be absent, in each of the external pad bonding area PA and the bit line bonding area BLBA, respectively included in the cell region CELL and the peripheral circuit region PERI.

In the external pad bonding area PA, the first NVM 110_1 may include a lower metal pattern 273*a*, corresponding to an upper metal pattern 372*a* formed in an uppermost metal layer of the cell region CELL, and having the same cross-sectional shape as the upper metal pattern 372*a* of the cell region CELL so as to be connected to each other, in an uppermost metal layer of the peripheral circuit region PERI.

In the peripheral circuit region PERI, the lower metal pattern 273*a* formed in the uppermost metal layer of the peripheral circuit region PERI may not be connected to a contact. Similarly, in the external pad bonding area PA, an upper metal pattern 372*a*, corresponding to the lower metal pattern 273*a* formed in an uppermost metal layer of the peripheral circuit region PERI, and having the same shape as a lower metal pattern 273*a* of the peripheral circuit region PERI, may be formed in an uppermost metal layer of the cell region CELL.

The first and second lower bonding metals 271*b* and 272*b* may be formed on the fifth metal layer 240*b* in the word line bonding area WLBA. In the word line bonding area WLBA, the first and second lower bonding metals 271*b* and 272*b* of the peripheral circuit region PERI may be electrically connected to the first and second upper bonding metals 371*b* and 372*b* of the cell region CELL by a Cu-to-Cu bonding.

Furthermore, in the bit line bonding area BLBA, an upper metal pattern 392, corresponding to a lower metal pattern 252 formed in the uppermost metal layer of the peripheral circuit region PERI, and having the same cross-sectional shape as the lower metal pattern 252 of the peripheral circuit region PERI, may be formed in an uppermost metal layer of the cell region CELL. A contact may not be formed on the upper metal pattern 392 formed in the uppermost metal layer of the cell region CELL.

In an example embodiment, corresponding to a metal pattern formed in an uppermost metal layer in one of the cell region CELL and the peripheral circuit region PERI, a reinforcement metal pattern having the same cross-sectional shape as the metal pattern may be formed in an uppermost metal layer in the other one of the cell region CELL and the peripheral circuit region PERI. A contact may not be formed on the reinforcement metal pattern.

While the present disclosure has been particularly shown and described with reference to example embodiments thereof, it is to be understood that various changes in form and details may be made therein without departing from the spirit and scope of the following claims.

What is claimed is:

1. A memory device configured to restore data based on power supply being blocked during programming of a storage device, the memory device comprising:

a storage device including a first area and a second area, the first area comprising a first data column that is to be programmed and the second area configured to store pre-stored restoration data of the first data column in preparation for power supply being blocked during programming, wherein the restoration data is generated from pieces of data to be written in the first data column; and a processor configured to:

identify a program state of the first data column programmed in a first stripe of the storage device; and complete programming of the first data column based on the program state of the first data column;

wherein the processor is further configured to:

determine that the programming of the first data column has stopped based on flag data inserted in each piece of the first data column;

generate a second data column by combining at least one portion of the pre-stored restoration data stored in the second area with valid data of the first data column that has completed programming; and program the second data column in a second stripe.

2. The memory device of claim 1, wherein the processor is further configured to:

determine a program stop position of the first data column, based on the power supply being resumed.

3. The memory device of claim 2, wherein the processor is further configured to:

configure the second data column by adding at least one portion of the restoration data to valid data of the first data column that has completed the programming.

4. The memory device of claim 1, wherein the processor is further configured to:

configure first programming information of the first data column to be same as second programming information of the second data column.

5. The memory device of claim 1, wherein the processor is further configured to:

generate parity data of the second data column.

6. The memory device of claim 1, wherein the processor is further configured to:

generate parity data through an XOR operation on at least one portion of data programmed in the second data column.

7. The memory device of claim 1, wherein the processor is further configured to:

determine, based on pre-configured variable data inserted in the first data column, whether the programming of the first data column has stopped.

8. An operating method of a memory device for restoring data based on power supply being blocked during programming of a storage device, the operating method comprising:

identifying a program state of a first data column programmed in a first stripe of the storage device; and completing programming of the first data column based on the program state of the first data column, wherein the completing of the programming of the first data column comprises:

determining that the programming of the first data column has stopped based on flag data inserted in each piece of the first data column;

generating a second data column by combining at least one portion of pre-stored restoration data stored in a second area with valid data of the first data column that has completed programming; and programming the second data column in a second stripe.

9. The operating method of claim 8, further comprising:

determining a program stop position of the first data column, based on the power supply being resumed.

10. The operating method of claim 9, further comprising:

configuring the second data column by adding at least one portion of the restoration data to valid data of the first data column that has completed the programming.

11. The operating method of claim 8, further comprising:

configuring first programming information of the first data column to be same as second programming information of the second data column.

12. The operating method of claim 8, further comprising:

generating parity data of the second data column.

13. The operating method of claim 8, further comprising:

generating parity data through an XOR operation on at least one portion of data programmed in the second data column.

14. The operating method of claim 8, wherein the determining that the programming of the first data column has stopped comprises:

determining, based on pre-configured variable data inserted in the first data column, that the programming of the first data column has stopped.

15. A memory device configured to restore data based on power supply being blocked during programming of a storage device, the memory device comprising:

a storage device including a first area and a second area, the first area comprising a first data column that is to be programmed, the second area configured to store pre-stored restoration data of the first data column in preparation for power supply being blocked during programming, wherein the restoration data is generated from pieces of data to be written in the first data column;

a memory storing instructions; and at least one processor communicatively coupled to the memory, wherein the at least one processor is configured to execute the instructions to:

identify a program state of the first data column programmed in a first stripe of the storage device;

determine, based on flag data inserted in each piece of the first data column, that programming of the first data column has stopped; and complete programming of the first data column based on the program state by:

generating a second data column by combining at least one portion of the pre-stored restoration data stored in the second area with valid data of the first data column that has completed programming; and programming the second data column in a second stripe.

16. The memory device of claim 15, wherein the at least one processor is further configured to execute further instructions to:

determine a program stop position of the first data column, based on the power supply being resumed.

17. The memory device of claim 16, wherein the at least one processor is further configured to execute further instructions to:

configure the second data column by adding at least one portion of the restoration data to valid data of the first data column that has completed the programming.

18. The memory device of claim 16, wherein the at least one processor is further configured to execute further instructions to:

generate parity data through an XOR operation on at least one portion of data programmed in the second data column.

19. The memory device of claim 15, wherein the at least one processor is further configured to execute further instructions to:

configure first programming information of the first data column to be same as second programming information of the second data column.

20. The memory device of claim 15, wherein the at least one processor is further configured to execute further instructions to:

generate parity data of the second data column.

* * * * *